United States Patent [19]

Heller et al.

[11] Patent Number: 4,636,159

[45] Date of Patent: Jan. 13, 1987

[54] APPARATUS FOR OBTAINING A PREDETERMINABLE DISTRIBUTION OF WEIGHT IN THE TRANSVERSE DIRECTION OF A PRE-MAT AND/OR MAT

[75] Inventors: Wolfgang Heller, Bad Pyrmont; Peter Rückert, Springe; Dieter Wiemann, Barsinghausen, all of Fed. Rep. of Germany

[73] Assignee: Bison-Werke Bahre & Greten GmbH & Co. KG, Springe, Fed. Rep. of Germany

[21] Appl. No.: 720,254

[22] Filed: Apr. 5, 1985

[30] Foreign Application Priority Data

Apr. 16, 1984 [EP] European Pat. Off. ........... 84104310
Apr. 16, 1984 [EP] European Pat. Off. ........... 84104309

[51] Int. Cl.[4] ........................ B29C 43/22; B29C 43/58

[52] U.S. Cl. ...................................... 425/148; 222/55; 425/80.1; 425/169; 425/505; 425/140

[58] Field of Search ............... 425/140, 141, 145, 148, 425/80.1, 83.1, 169, 505; 222/55, 56

[56] References Cited

U.S. PATENT DOCUMENTS

| | | | |
|---|---|---|---|
| 2,591,269 | 9/1960 | Vajda et al. | 425/80.1 |
| 2,635,301 | 4/1953 | Schubert et al. | 425/83.1 |
| 2,822,024 | 2/1958 | Himmelheber et al. | 156/360 |
| 3,158,291 | 11/1964 | Lytton et al. | 222/56 |
| 3,312,999 | 4/1967 | Greten et al. | 425/80.1 |
| 3,663,137 | 5/1972 | Haas et al. | 425/148 |
| 3,665,065 | 5/1972 | Haas et al. | 264/113 |
| 3,748,693 | 7/1973 | Jesperson | 425/82.1 |
| 3,825,152 | 7/1974 | Davis et al. | 222/55 |
| 4,037,462 | 7/1977 | Necker et al. | 73/32 R |
| 4,133,455 | 1/1979 | Moser | 222/55 |
| 4,257,518 | 3/1981 | Stock et al. | 222/55 |
| 4,322,971 | 4/1982 | Strobel | 73/159 |

FOREIGN PATENT DOCUMENTS

| | | | |
|---|---|---|---|
| 69162 | 1/1983 | European Pat. Off. . | |
| 1528236 | 5/1970 | Fed. Rep. of Germany . | |
| 2214900 | 10/1973 | Fed. Rep. of Germany . | |
| 7515958 | 12/1975 | Fed. Rep. of Germany . | |
| 2557352 | 8/1977 | Fed. Rep. of Germany . | |
| 2621512 | 6/1978 | Fed. Rep. of Germany . | |
| 2621513 | 8/1979 | Fed. Rep. of Germany . | |
| 0825707 | 5/1981 | U.S.S.R. | 425/83.1 |

*Primary Examiner*—Willard E. Hoag
*Attorney, Agent, or Firm*—Merchant, Gould, Smith, Edell, Welter & Schmidt

[57] ABSTRACT

Apparatus for obtaining a predeterminable distribution of weight per unit area in the transverse direction of a mat formed on a movable support for the manufacture of chip board, fiber board and similar boards is described by means of which fluctuations of the raw material composition and fluctuations of the chip geometry can be compensated for, having regard to the retention of a desired distribution of weight per unit area, by varying the thickness of the pre-mat or mat, or, in the case of a mat which is built up of a plurality of layers, of at least one of the mat layers, at least region by region, by mechanical action over the width of the mat in dependence on a desired distribution of the weight per unit area over the width of the pre-mat, or of the mat or of the mat layer.

5 Claims, 6 Drawing Figures

Figure 1:
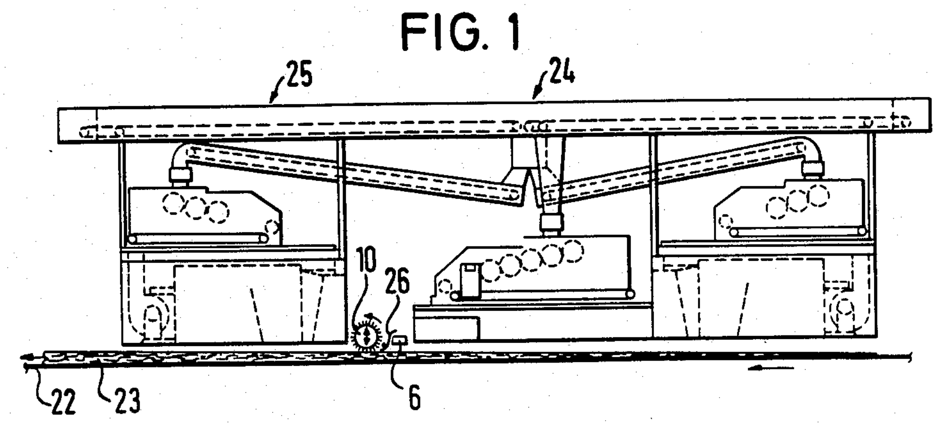

APPARATUS FOR OBTAINING A PREDETERMINABLE DISTRIBUTION OF WEIGHT IN THE TRANSVERSE DIRECTION OF A PRE-MAT AND/OR MAT

The invention relates to a method of obtaining a predeterminable distribution of weight per unit area in the transverse direction of a pre-mat and/or mat formed on a flat conveyor band and consisting of particles such as chips, fibers or the like containing lignocellulose and/or cellulose with at least one binding agent dispersed therein. Furthermore, the invention is directed to an apparatus for carrying out this method.

A scattering device for compensating for differential weights per unit area in the transverse direction of chip or fiber mats or the like during the manufacture of chip board, fiber board and the like is known from DE-PS 22 14 900. In this device a backwards scraping roller or the like is provided above a metering conveyor band for the chips, fibers or the like which are scattered onto the metering conveyor band. The gap width between the metering conveyor band and the backwards scraping roller can be adjusted to compensate for differential weights per unit area in the transverse direction of the mat, in as much as the metering conveyor band is steplessly adjustable beneath the backwards scraping roller and in as much as the height of the metering conveyor band can be differentially adjusted in the transverse direction.

A disadvantage of this known solution is the fact that on lifting or raising the metering conveyor band section-wise the respective neighbouring segments are always also affected and changed in an undesired manner. Furthermore, it is a disadvantage that the metering conveyor band can be damaged across its width as a result of differential expansions, that the metering conveyor band can be abraded away in the region of the seals relative to the sidewall of the bunker, and moreover that the metering conveyor band which in this case is difficult to guide, cannot be sealed dust-tight relative to the sidewalls of the bunker.

The problem underlying the present invention is to execute a method of the initially defined kind in such a way that, while saving chip material, the distribution of weight per unit area in the transverse direction of a pre-mat and/or mat can be very accurately predetermined, that fluctuations of the raw material composition and fluctuations in the chip geometry can be compensated for at once having regard to retaining a desired distribution of weight per unit area, and that a changeover from one thickness of pre-mat or mat to another thickness can be carried out without problems. The apparatus for carrying out the method should be of simple contruction, easy to actuate and reliable in its operation, and should also be suitable for retro-fitting in esisting plants.

The part of the problem relating to the method is solved in accordance with the invention in that measured values representative of the weight per unit area are formed from strip-like regions which adjoin one another in the transverse direction of the pre-mat and/or mat; and in that the height of each of these strip-like regions related to the flat conveyor belt is changed at least region-wise by mechanical action over the width of the mat during the course of the mat formation in dependence on the respectively associated measured value and a desired distribution of weight per unit area over the width of the pre-mat and/or mat.

A very differentiated volume profile in the transverse direction of the particular mat can be achieved by the provision of a plurality of pre-mat and/or mat regions which adjoin one another in the transverse direction, with the respective weight per unit area of these regions being capable of being very accurately predetermined by influencing a backwards scraping member associated in each case with the particular region, and by excluding mutual effects between regions which lie adjacent one another.

The correction of weight per unit area during the formation of the pre-mat has the substantial advantage that the corrections which may have to be carried out during the subsequent mat formation are minimised and accordingly that the quantity of the material which has to be returned during such mat formation is small. In order, in any event, to be able to effect an ideal correction the central layer of the mat is preferably scattered with an excess of material which is larger than the maximum expected negative scattering error in each correction section. If one operates with correction of the premat then the material excess which has to be used when scattering the central layer is in turn considerably reduced which is likewise the result of the advantageous cooperation of the correction measures during formation of the pre-mat and during formation of the final mat.

Surprisingly, in many cases correction of the pre-mat is however sufficient on its own. Thus in this case corrective action during the formation of the final mat is unnecessary.

Further advantageous developments of the method and of the apparatus for carrying out the invention are set forth in the patent claims.

Figure 2:
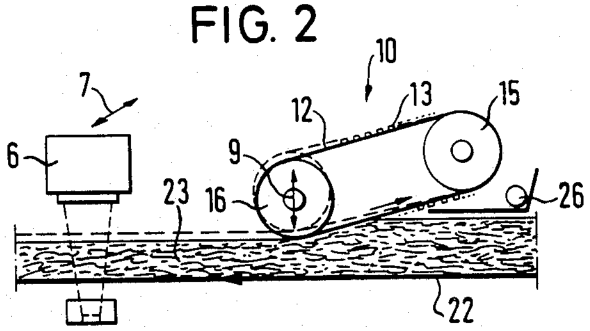
Figure 3:
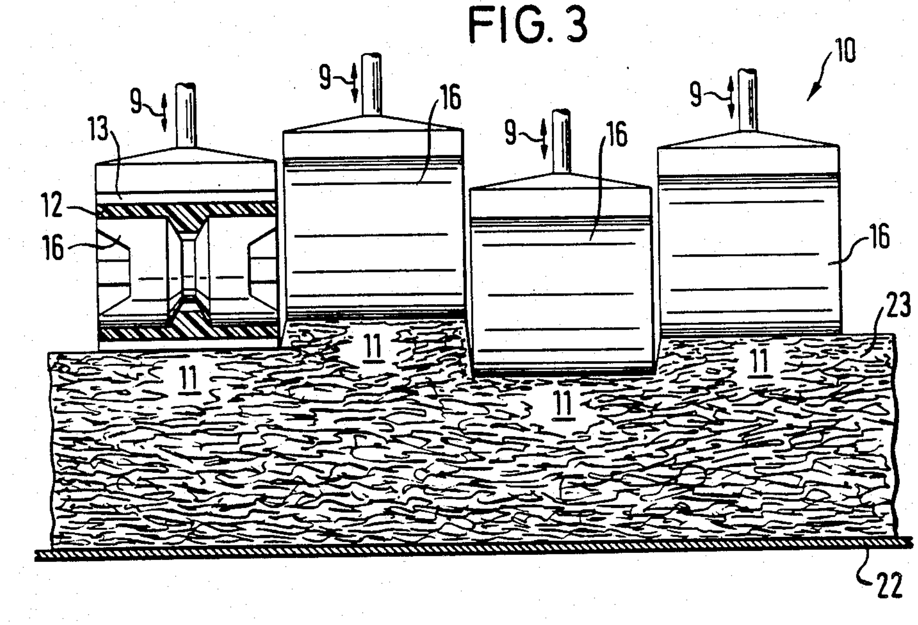
Figure 4:
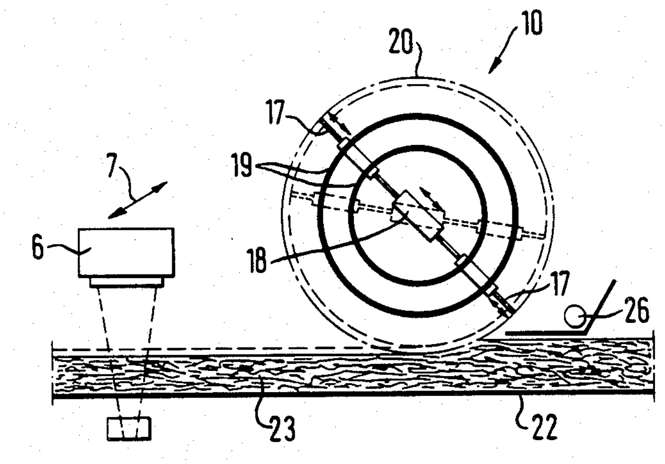
Figure 5:
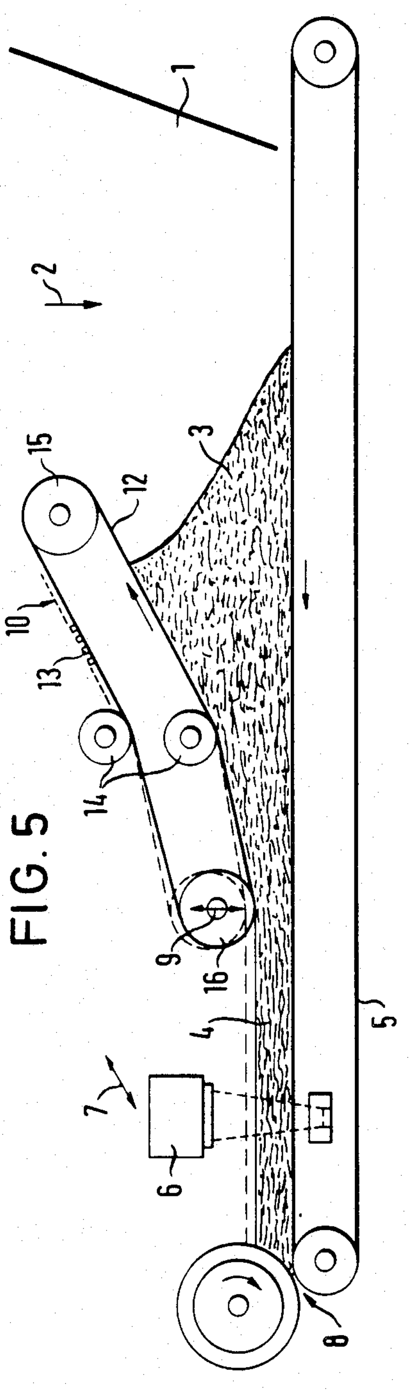
Figure 6:
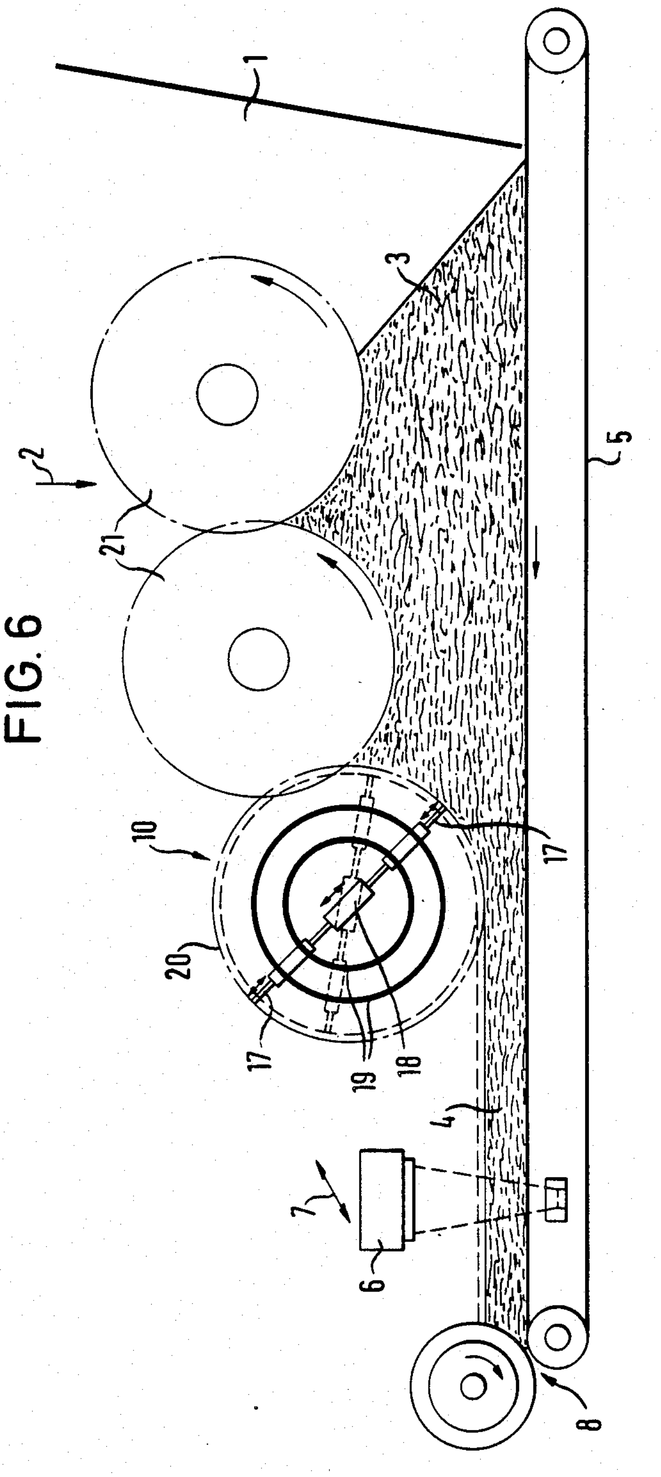

The invention will now be described in more detail with reference to exemplary embodiments as shown in the drawings in which are shown:

FIG. 1 a schematic illustration of an apparatus which operates in accordance with the method of the invention for compensating for fluctuations in weight per unit area, FIG. 2 a schematic illustration of an embodiment of a backwards scraping and measuring device for use in a plant in accordance with FIG. 1, FIG. 3 a schematic view in the transverse direction of a mat to explain the manner of operation of the apparatus of FIG. 2, and of FIG. 5 during the formation of a pre-mat, with the apparatus being modified, FIG. 4 a schematic illustration of a variant of the apparatus of FIG. 2, FIG. 5 a schematic illustration of an apparatus for compensating for fluctuations in weight per unit area during the formation of pre-mats, and FIG. 6 a schematic illustration of a variant of the apparatus of FIG. 5.

FIG. 1 shows a section of an endless mat carrier 22 which runs beneath a scattering station. The scattering station includes a unit 24 for forming the lower covering layer and the middle layer of the mat 23 and also a section 25 for forming the upper covering layer of the mat 23.

A backwards scraping device or levelling device 10 which is divided into sections in the transverse direction is arranged between the sections 24 and 25. The spacing of the individual sections which lie adjacent one another in the transverse direction, from the mat carrier 22 can be jointly and also individually adjusted as illustrated by the double arrow. A measuring device 6, which is preferably a traversing measuring device, is arranged directly in front of the backwards scraping device 10. The backwards scraping device 10 cooperates with an apparatus 26 for returning the material which is scraped backwards by the apparatus 10.

In accordance with FIG. 2 the backwards scraping apparatus 10 consists of several endless belts 12 which lie directly adjacent one another in the transverse direction of the mat carrier 22 and which are provided with entraining members 13 on their outer sides. These strip-like endless belts 12 which jointly form the apparatus 10 are guided over a common drive roller 15 and in each case over their own deflection roller 16. The deflection rollers 16 can be jointly and also individually adjusted with respect to their distance from the mat carrier 22 as illustrated by the arrow 9.

The spacing of the drive roller 15 relative to the mat carrier 22 is always considerably larger than the respective distances of the individual deflection rollers 16 from the mat carrier 22, so that the backwards scraping effects necessary for the compensation of fluctuations in weight per unit area can always be achieved, and so that a mat 23 is present after the backwards scraping device which consists of a lower covering layer and a central layer and has the desired distribution of weight per unit area, which can no longer be varied in any disturbing manner by the scattering of the covering layer which subsequently takes place.

A measuring device 6 for determining the weight per unit area is associated with the backwards scraping device 10 and arranged on a beam so that it can be moved in the direction of the arrow 7 transverse to the mat 23 and thereby determine the values of weight per unit area transverse to the direction of movement of the mat. This measuring apparatus 6 is inserted in FIG. 2 after the backwards scraping device 10, is however preferably arranged directly in front of the backwards scraping device 10. Examples of such measuring devices are shown, for example, in U.S. Pat. No. 4,037,462 (guage 18) and U.S. Pat. No. 4,322,971, column 1, line 11 and column 3, lines 24–26.

In FIG. 2 a displacement of one of the adjacent sections of the backwards scraping device 10, in the sense of enlarging the gap between the mat carrier 22 and the corresponding roller 16, is indicated in broken lines. The consequence of an adjustment of this kind is that the corresponding section of the mat 23 has a larger height or thickness over the width of the corresponding section and this is also illustrated in broken lines.

FIG. 3 shows by way of example four adjacent sections 11 of the backwards scraping device 10 as shown in side elevation in FIG. 2. By way of example each section has a width of approximately 100 mm and this also corresponds to the width of the respective deflection rollers 16, with the associated endless belt 12 being equipped with entraining devices 13. The deflection rollers 16 are preferably provided with a peripheral notch into which a corresponding projection on the endless belt 12 engages, thereby ensuring absolutely straight running of the respective belt.

the deflection rollers 16 can be displaced in the direction of the arrows 9 relative to the mat carrier 22 whereby the quantity removed over the respective width of the segment is enlarged or reduced. This is indicated in FIG. 3 by the displacement of the endless belts 12 which determine the different segments 11.

The volume which is removed can however also be changed over the full working width by joint adjustment of the deflection rollers 16 and this forms a type of basic adjustment.

The rotational movement between the individual deflection rollers is transmitted by special couplings which are built in between the rollers 16 and which allow a large displacement of the axes. A preferred simplified backwards scraping device 10 is achieved if one uses only a customary backwards scraping rake (levelling rake) with a plurality of adjacent rake elements arranged alongside each other and each consisting of two arms, in place of the backwards scraping device 10 at the location of the deflection rollers 16.

The profiling of the pre-mat in the transverse direction which is illustrated in detail in FIG. 3 corresponds, by way of example, to a constant weight per unit area taking account of a differential volume originating from chip material of varying density.

FIG. 4 shows one variant of an embodiment of an apparatus in accordance with the invention in which parts having counter-parts in FIGS. 1 to 3 are provided with the same reference numerals. The backwards scraping device 10 is formed in this embodiment in the manner of a customary levelling rake with a plurality of rake elements 17 which are arranged alongside one another and which each have two arms. In each case a plurality of adjacent two-armed rake elements 17 form a segment 11 in the sense of the illustration of FIG. 3.

In the embodiment of FIG. 4, in contrast to the embodiment of FIGS. 2 and 3 in which the spacing of the deflection rollers 26 from the mat carrier 22 was changed, a change of the working circle 20 is obtained, while the axis of rotation of the metering rake 10 remains fixed, by changing the radial length of the rake elements 17 which are of telescope-like construction and which can be actuated via an adjustment device 18. By way of example the two rake elements 17 are mounted in two concentrically arranged hollow tubes 19 in which the adjustment means 18 are mounted. Each segment can be adjusted to a different gap width relative to the mat carrier 22, analogously to the embodiment of FIG. 3, by controlling these adjustment devices 18, in particular in dependence on the measured values of the weight per unit area derived from the measuring device 6, whereby the volume is varied and can be selected so that a constant weight per unit area is in turn obtained in the transverse direction of the mat 23.

FIG. 5 shows a bunker 1 into which adhesive coated wood chips for example are introduced in the direction of the arrow 2.

A pre-mat 4 is formed from the supply of chips 3 with the aid of the metering conveyor band 5, which bounds the bottom end of the bunker 1, and of a backwards scraping device 10. The pre-mat 4 leaves the metering conveyor band 5 at a discharge point 8.

The backwards scraping device 10 is constructed similarly to that of FIGS. 2 and 3 and operates accordingly.

A further rake, or a plurality of such rakes, can be inserted in front of the backwards scraping device 10 of FIG. 5 and in a customary plant the flexible metering rake 10 can also be subsequently fitted in place of the last rake before the discharge point.

FIG. 6 shows a variant of an embodiment of an apparatus in accordance with the invention in which the same numbers have been used to designate parts which have counter-parts in FIGS. 3 and 5.

The backwards scraping device 10 is in this embodiment formed in the manner of a customary backwards scraping rake with a plurality of adjacent rake elements 17 each of which has two arms. In each case a plurality of adjacent two-armed rake elements 17 form a segment 11 in the sense of the representation of FIG. 3.

In the embodiment of FIG. 6, in contrast to the embodiment of FIG. 5 in which the spacing of the deflection roller 16 from the metering conveyor band 5 was changed, a change of the working circle 20 of the respective segment takes place, while the axis of rotation of the metering rake 10 remains fixed, by changing the radial length of the rake elements which are of telescope-like construction and which can be actuated by a displacement device 18. By way of example the rake elements 17 are mounted in two concentrically arranged hollow tubes 19 in which the displacement means 18 are mounted. By controlling these adjustment means 18, in particular in dependence on the measured values for the weight per unit area derived by means of the measuring device 6, each segment can be adjusted to a different gap width relative to the metering conveyor band 5, whereby the volume is varied and can be selected so that a constant weight per unit area again results in the transverse direction of the pre-mat 5.

All the described embodiments have in common:

the fact that the adjustment of the segments can take place during operation outside of the bunker 1, the fact that the scattering results can be improved with a simultaneous saving of chip material, in particular in conjunction with the associated measuring device 6, the fact that the crude density profile in the production direction can be changed during operation and, by way of example, that higher densities can be selected in the edge zones and in the prior known longitudinal section zones, the fact that the proven function of the two-armed backwards scraping rake in the accordance with the embodiment of FIG. 3 can be retained unchanged, the fact that retrofitting is possible at any time in existing plant, and the fact that an exact outlet height can be selected between the metering conveyor band 5 and the individual segments 11 without the preselected outlet height for the neighbouring segments being changed.

We claim:

1. Apparatus for obtaining a predetermined fiber distribution in weight per unit area in the traverse direction of a fiber deposit on a conveyor in the manufacture of particle board, the apparatus comprising: a flat conveyor belt, at least one backwards scraping unit extending across the width of the conveyor, belt, means for measuring the weight per unit area of the fiber deposit across the width of the conveyor belt, said backwards scraping unit being a metering rake which is adjustable to provide different regions of thickness across said width in response to said means for measuring such as to obtain said predetermined fiber distribution the metering rake being divided over the width of the conveyor into individual segments, spacings of said segments above said conveyor being individually adjustable independently of each other, said individual segments also being connected together by couplings for displacement of segment axes as a group.

2. Apparatus in accordance with claim 1, wherein a traversing measuring device is disposed between said metering rake and a discharge end of said conveyor, said rake having plural individually adjustable segments disposed across the width of said conveyor.

3. Apparatus in accordance with claim 1, characterized in that rotating metering rakes consist of a plurality of rake elements which are arranged alongside one another, with length of the rake elements being adjustable in telescope-like manner; and in that, in each case, several neighboring rake elements form a segment with elements which are jointly adjustable in length.

4. Apparatus in accordance with claim 1, characterized in that each metering rake segment consists of an endless belt equipped with entrainment devices; and in that all adjacent endless belts are guided on the one hand around a common drive roller and on the other hand are each led about a respective vertically adjustable deflection roller.

5. Apparatus according to claim 1, wherein additional means are provided for equalizing the weight per unit area in addition to the scraping unit which is adjustable in response to said means for measuring, said additional means being positioned following said scraping unit.

* * * * *